Patented Dec. 26, 1933

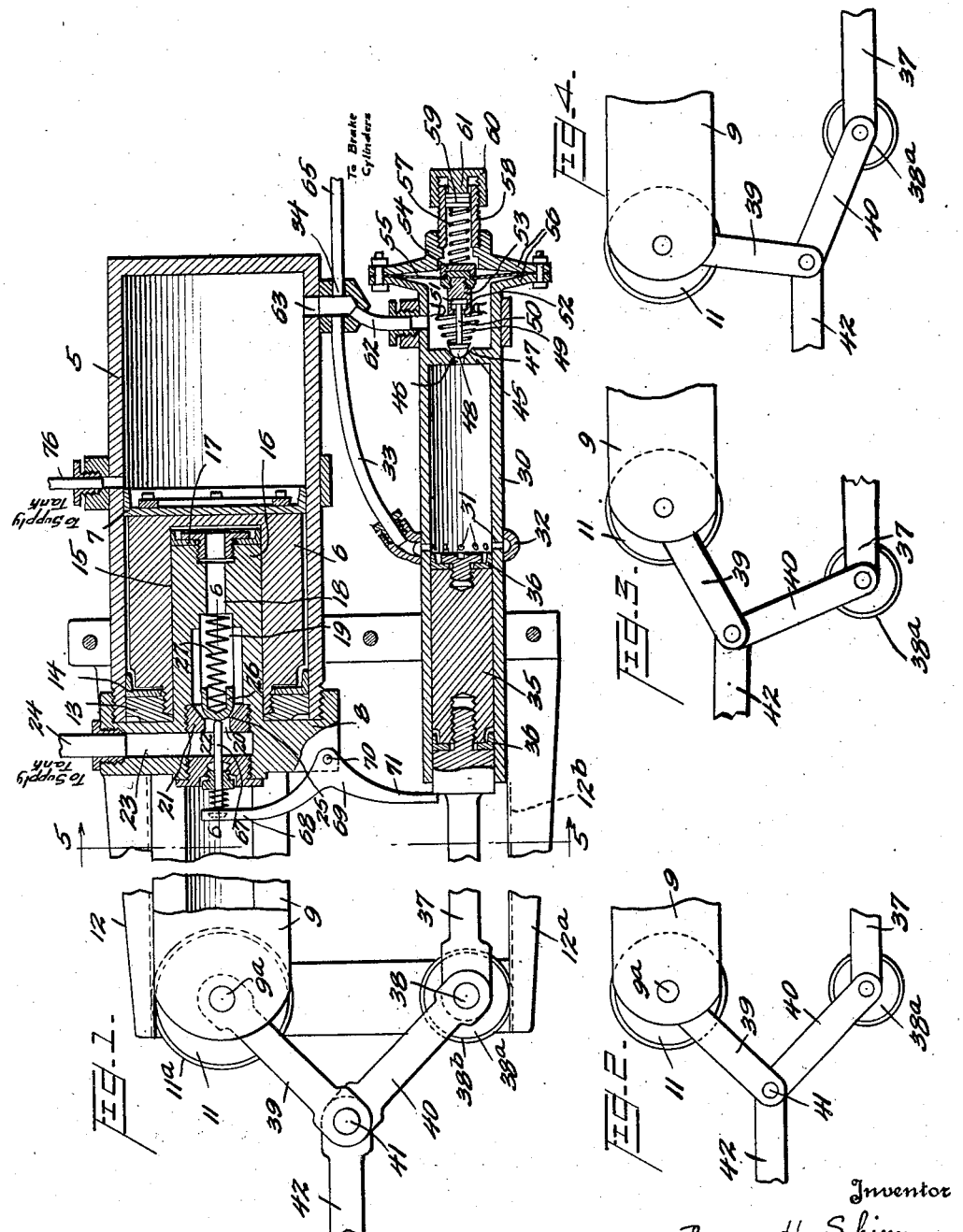

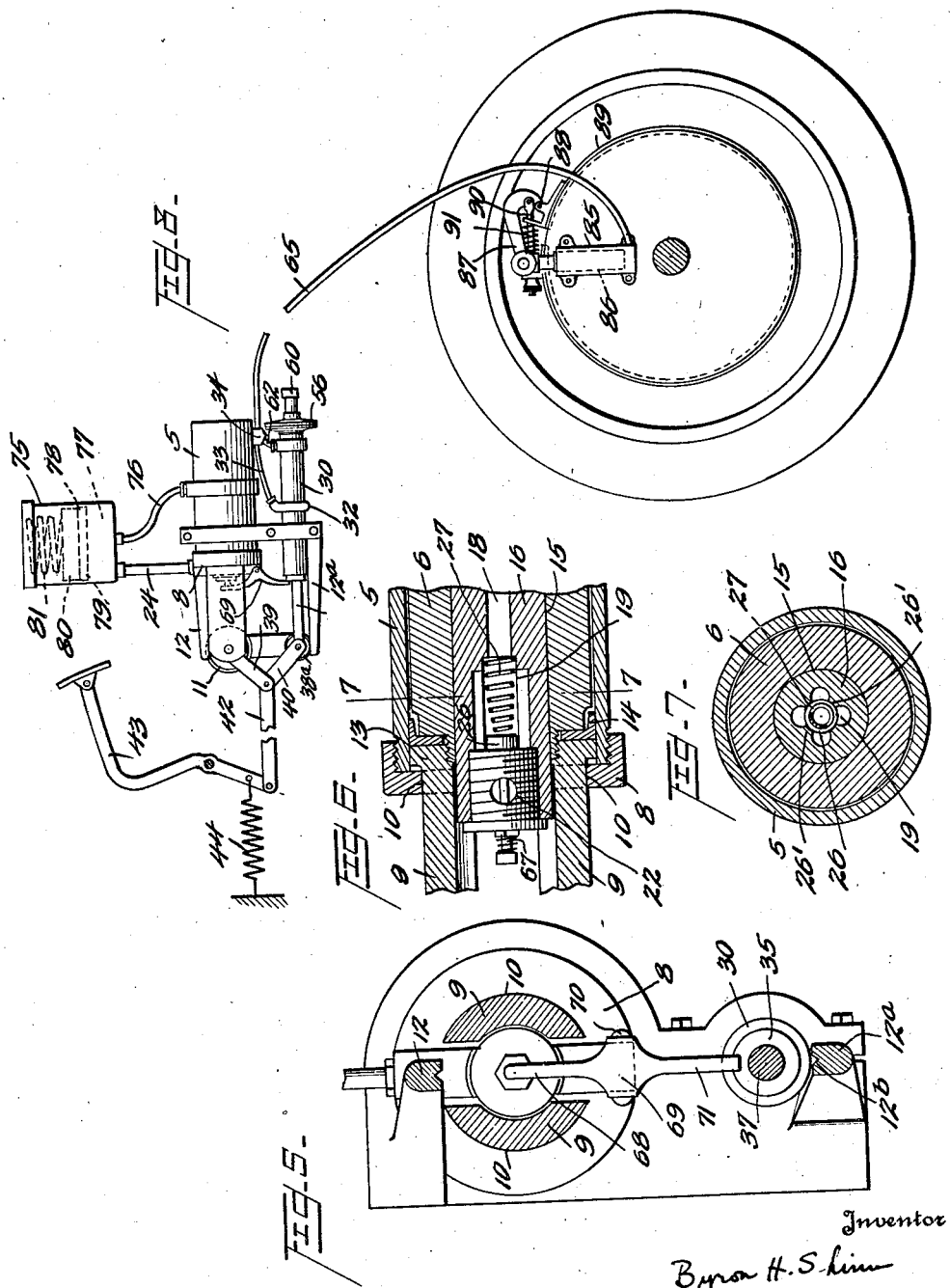

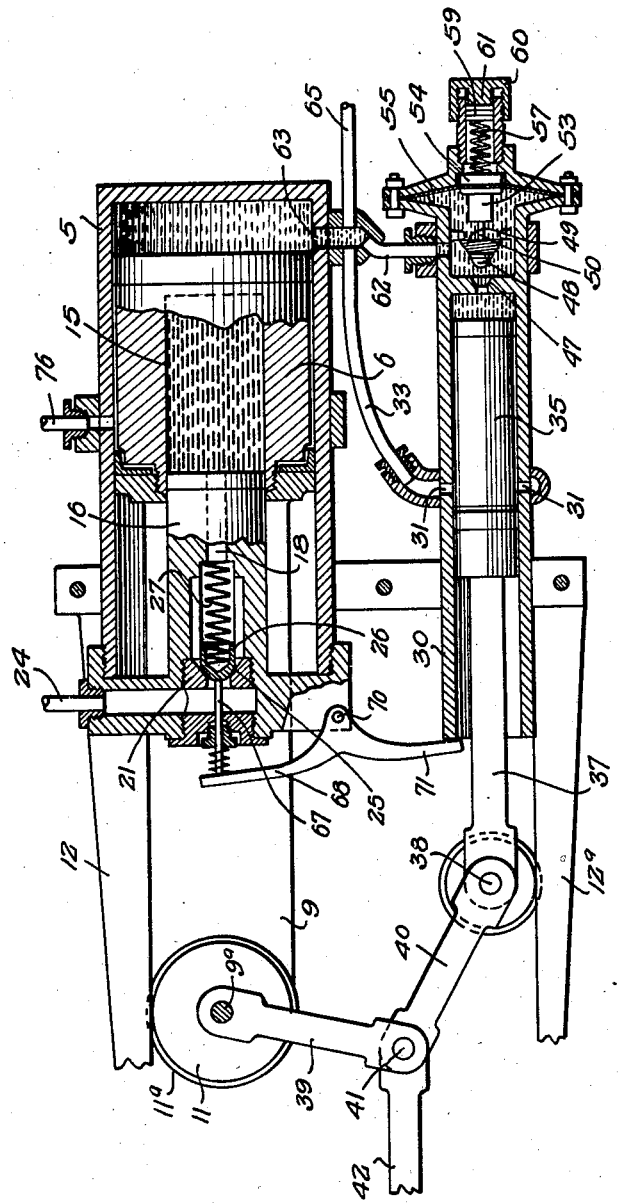

1,940,822

UNITED STATES PATENT OFFICE 1,940,822

HYDRAULIC BRAKING SYSTEM

Byron H. Shinn, Washington, Pa., assignor to Shinn Devices Corporation, Washington, Pa., a corporation of Delaware Application September 10, 1929. Serial No. 391,528

10 Claims. (Cl. 60—54.6)

This invention is concerned with hydraulic braking systems for vehicles, particularly with the master pump mechanism for creating the fluid pressure which actuates the hydraulic brake.

In a hydraulic brake, it is not necessary that great pressure be applied during the first part of the stroke, the first part of the stroke operating merely to take up the slack in the actuating parts and in the brake bands or brake shoes. After the slack has been taken up, and the bands or shoes are beginning to grip the brake drum, it is then desirable to intensify the braking action by materially increasing the pressure applied to the brake actuating mechanism.

According to this invention, therefore, a pumping mechanism is provided which at the beginning of its operation, operates rather quickly to take up the slack in the parts, and after the slack has been taken up, operates to send a high pressure to the brake for intensifying the braking action.

More specifically, the invention comprises a large low pressure piston and a small high pressure piston. When the brake pedal is first actuated the low pressure piston only is moved, sending a large volume of fluid into the system to take up the slack. Then, after the slack is thus taken up, the small high pressure piston comes into operation to intensify the braking action.

The construction is particularly desirable for heavier vehicles such as motor trucks which, due to their weight, need to have brakes which can be strongly applied. The small high pressure piston of this invention operates to apply the brakes very strongly after the large low pressure piston has taken up the slack in the parts.

The two pistons are preferably, although not necessarily, in cylinders which are located side by side, and normally move in the same directions on their power strokes. However, when one piston is moving on its power stroke, the other is locked against movement by a fluid block, as will be described. The large low pressure piston starts moving first to take up the slack, and after it has moved a certain distance, thereby building up a certain back pressure, the small high pressure piston coming into play to increase the pressure, the large low pressure piston being held against backward movement at this stage by a fluid block.

The two pistons are operated by some such mechanism as a toggle joint device, which distributes the push from the pedal to the two pistons in varying ratios.

The described fluid block for the low pressure piston holds that piston in its extended position at the end of its power stroke, until the high pressure piston has returned to its original position. The fluid block is then released to allow the low pressure piston to return to its original position.

During the first stage of operation of the device, the high pressure piston is normally inactive, being held in position by a fluid block. After a certain back pressure has been built up in the system, a pressure responsive valve mechanism releases the fluid block and so brings the high pressure piston into operation.

The invention comprises further details of construction which are illustrated in the accompanying drawings.

In these drawings, Figure 1 is a sectional view showing the cylinder mechanism and associated parts.

Figures 2, 3 and 4 are views showing successive positions of the toggle mechanism.

Figure 5 is a section taken on the line 5—5 of Figure 1.

Figure 6 is a section taken on the line 6—6 of Figure 1.

Figure 7 is a section taken on the line 7—7 of Figure 6; and

Figure 8 is a diagrammatic view showing the apparatus and associated parts.

Figure 9 is a view similar to Figure 1, showing the pistons at the ends of their respective strokes.

Referring now to these drawings in which similar reference characters indicate similar parts, 5 is a large low pressure cylinder in which the piston 6 moves; the piston is provided with the usual packing washer 7. The cylinder head for the cylinder 5 is shown at 8. The piston 6 is operated by arms 9 forming a bifurcated piston rod which slides through arcuate slots 10 in the cylinder head 8. The arms 9 at their outer ends, carry a pin 9a, on which is mounted a wheel 11 which is held against outward movement by a grooved guideway 12, wheel 11 having an annular projection 11a moving in this grooved guideway.

The arms 9 are integral with or secured to a disc member 13 which is fixed to the piston body 6. Between these two members a packing washer 14 may be mounted as shown.

The purpose of providing arms 9 instead of the usual central piston rod, is to allow for certain passages and valves used in connection with the fluid block, as will now be described.

The large piston 6 is provided with a central hollowed out portion forming an internal cylinder 15 in which slides a piston 16, provided with the usual packing washer 17. The piston 16 is not movable, being fixed to or integral with the cylinder head 8. The piston 16 is hollowed out as shown at 18 and 19 so as to be in communication with the passage 20 in the bushing 21 which is threaded into the cylinder head. The space 20 in the bushing 21 is in communication by passages 22 and 23 with a pipe 24 leading to a supply reservoir 75 where fluid is maintained under a slight pressure.

The inner end of bushing 21 is formed as a valve seat 25 on which is seated a spring pressed valve 26, the spring for which is shown at 27. As shown in Figure 7, valve 26 is guided in its movement by guides 26'.

With the parts thus far described, it will be seen that as the large piston 6 moves to the right, there is a tendency to form a vacuum in the cylinder 15, and so liquid will be drawn in through 24, 23, 22, 19 and 18 into the cylinder 15 inside the large piston, which flow is aided by the head of fluid in 24. As the large piston moves to the right, the space to the right of piston 16 will be filled with fluid, such as oil. The valve 26 acts as a one-way valve up to this point, and it will be seen that the oil in the cylinder 15 acts as a fluid block to prevent return movement of the piston after its power stroke, as long as the valve 26 is seated. It will be understood that the power stroke of the piston 6 is to the right.

The small high pressure cylinder is indicated at 30. This cylinder is provided at an intermediate point with openings 31 surrounded by a hollow collar 32, the interior of which communicates with a pipe 33 leading to a hollow block 34.

The high pressure piston 35 is provided with the usual washers 36 and with an actuating arm 37 provided with a pin 38. A wheel 38a is mounted on pin 38, this wheel moving in a guideway 12a, provided with a groove 12b for receiving the circular projection 38b on the rim of the wheel 38a.

On the two pins 9a and 38 are respectively mounted toggle levers 39 and 40, which are joined by the pin 41 with an actuating rod 42 which is connected, as shown in Figure 8, with a brake pedal 43 provided with the usual retracting spring 44. At the right hand end of the high pressure cylinder 30 is a partition 45 provided with a passage-way 46 and valve seat 47 on which is seated a valve 48 urged to its seat by a spring 49. The valve 48 has a stem 50 terminating in a head 51, which engages in a space 52 in a plug 53, whereby it has a small play in this space 52. The plug 53 engages with a washer member 54, the elements 53 and 54 clamping between them a diaphragm 55, preferably of spring metal. The diaphragm 55 is held between flanges 56. The diaphragm is spring-loaded by an adjustable spring 57, housed in the tubular housing member 58. The force exerted by spring 57 on the diaphragm can be varied by inserting a varying number of shims 59 at the right hand end of the spring, and by varying the setting of the screw cap 60 which has an abutment 61 bearing against the shims.

The space between partition 45 and the diaphragm 55 communicates by a pipe 62 with the hollow block 34. This block 34 also communicates by passage-way 63 with the low pressure cylinder 5 and communicates by a pipe 65 with the brake mechanism on the wheel.

The one-way valve 26 is engageable by a rod 67 with the arm 68 of a lever 69 pivoted at 70, the other arm 71 of which is in a position to be engaged by a portion of the high pressure piston 35 when that piston has returned to its original position after it has completed its power stroke.

The supply tank 75 is suitably positioned to supply fluid under pressure to the pipe 24, already described, and to a pipe 76, positioned near the middle of the low pressure cylinder 5. The fluid 77 in the reservoir is kept under a slight pressure in addition to gravity, by means of a snugly fitting disc 78 provided with a sealing washer 79 and loaded by a weight 80 or spring 81 or both.

Fluid pressure on the pipe line 65 is transmitted to the wheel and actuates the brake band or brake shoes by any suitable mechanism, such as that diagrammatically illustrated in Figure 8, where the pipe 65 connects with a cylinder 85 in which there is a piston 86 connected with a bent lever 87 pivoted at 88 to one side of the brake band 89 and connected with the other side of the brake band by means of a rod 90, with which is associated the usual retracting spring 91.

The device operates as follows:

With the parts as shown in Figure 1, pressure is applied by the brake pedal to rod 42, the push being distributed through the toggle arms 39 and 40 equally to the two pistons 6 and 35. The high pressure piston 35 moves a short distance to the right, just enough to seal up the passages 31. This traps a block of oil between the piston and the partition 45, the valve 48 holding the oil in this space and so preventing any further movement of the piston. This makes the pin 38 act as a fulcrum, and as pressure on the rod 42 is continued, the low pressure piston 6 moves to the right sending a large volume of oil through 63, 34 and 65 to the braking cylinder 85 to take up the slack. This movement continues until the slack is taken up, and until a fairly high back pressure is built up in the system. When a sufficiently high back pressure has been built up, the diaphragm 55, which is exposed through pipe 62 to this back pressure, snaps to the right, pulls valve stem 50 and opens the valve 48 and so puts the high pressure piston in communication, through 62 and 34, with the pipe line 65, as shown in Fig. 9 so that the high pressure piston is now free to send oil into the system, which it does and so intensifies the braking effect.

The pressure created by the high pressure piston is exerted on the low pressure piston and would tend to move it to the left, were it not for the fluid block, the operation of which will now be described. As the low pressure piston 6 moves to the right on its power stroke, it draws in oil from the reservoir 24 past the valve 26 through the passages 19 and 18 into the space between the right hand end of the piston 16 and the right hand end of the piston 6. This body of oil is held in this space by the one-way valve 26, and when that valve is closed this body of oil acts as a fluid block and prevents any return movement, that is, movement to the left, of the low pressure piston 6 as shown in Fig. 9.

After both pistons have completed their power strokes, that is to say when they have both moved to the right of Figure 1, and the brake pressure on the brake pedal is released, the back pressure in the system, plus the pressure of spring 91, and pull of spring 44, moves the high pressure piston 35 to the left, until it regains its original position, the low pressure piston 6 meanwhile being held by the fluid block, the valve 26 being closed. As soon, however, as the high pressure piston has returned to its original position, it engages with the arm 71 of the lever 69, which pushes on rod 67 and opens the valve 26, allowing the oil to flow up pipe 24 back to the reservoir, thus releasing the fluid block and allowing the low pressure piston to return to its normal position. This completes the cycle of operation.

The toggle mechanism illustrated in Figures 2, 3 and 4, acts to distribute the push from the rod 42 to the toggle arms 39 and 40 and thence to the two pistons in gradually varying ratios, in the manner illustrated. Figure 2 shows the position at the beginning where the push is distributed substantially equally to the two toggle arms. At the beginning of the stroke, the pin 38, as has been described, acts as a fulcrum. The force from the rod 42 at this stage moves only the low pressure piston, so that at the conclusion of its stroke, the parts are substantially as shown in Figure 3. By this time, the high pressure piston comes into operation, while the low pressure piston is held by its fluid block so that the toggle arms at the end of both strokes, have assumed substantially the positions of Figure 4.

Referring to Figures 2, 3 and 4 it will be seen that at the beginning of the operation the toggle arm 39 is getting more nearly parallel to and in line with rod 42 and so is applying more power to the low pressure piston. It will also be seen that during the last part of the stroke the toggle arm 40 is getting more nearly parallel to and in line with rod 42, thereby gradually applying more and more power to the high pressure piston. This construction is particularly advantageous, in that from the beginning of the low pressure stroke, the power applied to the low pressure piston is gradually increased, and then after the high pressure piston comes into the operation, the power applied to it is gradually increased. In other words, there is a steady and gradual increase of pressure all along the line, resulting in a gradual and steady application of braking force to the brakes, which clearly is a desirable end to be attained.

While I have illustrated my invention in some detail, it should be understood that the invention is not limited to the details shown, but may be carried out in other ways, as expressed within the scope of the claims.

I claim as my invention:

1. In a pressure creating means for a hydraulic braking system, the combination of a small cylinder for generating high pressure, a larger cylinder for generating low pressure, pistons in the respective cylinders, a common means for applying power to the pistons, means for creating a fluid pressure block for holding the piston in the high pressure cylinder against movement when power is first applied to the pistons, and a common delivery pipe for receiving fluid under pressure from the said cylinders, and means for creating a fluid pressure block behind the low pressure piston as it moves forward on its power stroke, for preventing retrograde movement thereof.

2. In a pressure creating means for a hydraulic braking system, the combiantion of a small cylinder for generating high pressure, a larger cylinder for generating low pressure, pistons in the respective cylinders, a common means for applying power to the pistons, means for creating a fluid pressure block for holding the piston in the high pressure cylinder against movement when power is first applied to the pistons, and a common delivery pipe for receiving fluid under pressure from the said cylinders, means for releasing said fluid pressure block when the pressure in the system has built up to a predetermined point, and means for creating a fluid pressure block behind the low pressure piston as it moves forward on its power stroke, for preventing retrograde movement thereof.

3. In a pressure creating means for a hydraulic braking system, the combination of a small cylinder for generating high pressure, a larger cylinder for generating low pressure, pistons in the respective cylinders, a common means for applying power to the pistons, means for creating a fluid pressure block for holding the piston in the high pressure cylinder against movement when power is first applied to the pistons, a common delivery pipe for receiving fluid under pressure from the said cylinders, means for creating a fluid pressure block behind the low pressure piston as it moves forward on its power stroke for preventing retrograde movement thereof, and means operable by the high pressure piston when it returns to its starting position, for releasing the fluid pressure block on the low pressure piston.

4. In a pressure creating means for a hydraulic braking system, the combination of a small cylinder for generating high pressure, a larger cylinder for generating low pressure connected by a passage, which is unobstructed at all times to a common delivery pipe, pistons in the respective cylinders, a common means for applying power to the pistons, means including a pressure responsive valve which is closed at low pressures and opens only at high pressures actuated by a pressure responsive diaphragm, for creating a fluid pressure block for holding the piston in the high pressure cylinder against movement when power is first applied to the pistons, and a common delivery pipe for receiving fluid under pressure from the said cylinders.

5. In a pressure creating means for a hydraulic braking system, the combination of a small cylinder for generating high pressure, a larger cylinder for generating low pressure connected by a passage, which is unobstructed at all times to a common delivery pipe, pistons in the respective cylinders, a common means for applying power to the pistons, means including a spring loaded pressure responsive valve which at low pressures is held closed by the spring and which opens only at high pressures by the action of a pressure responsive diaphragm, for creating a fluid pressure block for holding the piston in the high pressure cylinder against movement when power is first applied to the pistons, and a common delivery pipe for receiving fluid under pressure from the said cylinders.

6. In a pressure creating means for a hydraulic braking system, the combination of a small cylinder for generating high pressure, a larger cylinder for generating low pressure, pistons in the respective cylinders, a common means for applying power to the pistons, a hollow member fixed in the low pressure cylinder, the piston in the low pressure cylinder being hollow and engageable telescopically over said hollow member, means for admitting fluid through the said hollow member, behind the low pressure piston on its power stroke, and for preventing escape of said fluid, for creating a fluid pressure block for locking the low pressure piston against retrograde movement, and a common delivery pipe connected with the high and low pressure cylinders.

7. In a pressure creating means for a hydraulic braking system, the combination of a small cylinder for generating high pressure, a larger cylinder for generating low pressure, pistons in the respective cylinders, a common means for applying power to the pistons, a hollow member fixed in the low pressure cylinder, the piston in the low pressure cylinder being hollow and engageable telescopically over said hollow member, means for admitting fluid through said hollow member behind the low pressure piston on its power stroke, and for preventing escape of said fluid, for creating a fluid pressure block for locking the low pressure piston against retrograde movement, means operated by the high pressure piston upon returning to its starting position, for releasing said fluid pressure block for allowing the low pressure piston to return to its starting position, and a common delivery pipe connected with the high and low pressure cylinders.

8. In a pressure creating means for a hydraulic braking system, the combination of a small cylinder for generating high pressure, a larger cylinder for generating low pressure, pistons in the respective cylinders, a common means for applying power to the pistons, means for creating a fluid pressure block for holding the piston in the high pressure cylinder against movement when power is first applied to the pistons, a common delivery pipe for receiving fluid under pressure from the said cylinders, means for creating a fluid pressure block behind the low pressure piston as it moves forward on its power stroke, for preventing retrograde movement thereof and a fluid reservoir, connected to supply fluid for the fluid block for the low pressure piston, and to supply fluid to the power side of the low pressure piston.

9. In a pressure creating means for a hydraulic braking system, the combination of small and large cylinders for generating high and low pressures respectively, pistons in the respective cylinders, the cylinders being fixed substantially parallel, piston rods for the respective pistons, toggle arms respectively pivoted to the outer ends of the piston rods, said toggle arms converging to a common meeting point, and operating means connected to the toggle arms at said common meeting point.

10. In a pressure creating means for a hydraulic braking system, the combination of small and large cylinders for generating high and low pressures respectively, pistons in the respective cylinders, the cylinders being fixed substantially parallel, piston rods for the respective pistons, toggle arms respectively pivoted to the outer ends of the piston rods, said toggle arms converging to a common meeting point, guide means cooperating with the piston rods for guiding the outer ends thereof, and operating means connected to the toggle arms at said common meeting point.

BYRON H. SHINN.